United States Patent
Shimahashi

(10) Patent No.: US 8,848,252 B2
(45) Date of Patent: Sep. 30, 2014

(54) CONTROL DEVICE CAPABLE OF GENERATING BINARY IMAGE DATA EXPRESSING SUITABLE GRADATION LEVELS

(71) Applicant: Takuya Shimahashi, Nagoya (JP)

(72) Inventor: Takuya Shimahashi, Nagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 79 days.

(21) Appl. No.: 13/747,991

(22) Filed: Jan. 23, 2013

(65) Prior Publication Data
US 2013/0208322 A1 Aug. 15, 2013

(30) Foreign Application Priority Data
Feb. 10, 2012 (JP) .................... 2012-027584

(51) Int. Cl.
G06K 15/00 (2006.01)
H04N 1/405 (2006.01)
G06K 15/02 (2006.01)

(52) U.S. Cl.
CPC ........... G06K 15/1877 (2013.01); H04N 1/405 (2013.01)
USPC ...................................... 358/3.13

(58) Field of Classification Search
None
See application file for complete search history.

(56) References Cited

U.S. PATENT DOCUMENTS

| 8,098,402 B2 * | 1/2012 | Jacobs et al. .................... 358/2.1 |
| 2004/0109184 A1 * | 6/2004 | Ishii ................................. 358/1.9 |
| 2006/0181739 A1 * | 8/2006 | Yamakado .................... 358/3.13 |
| 2008/0285083 A1 * | 11/2008 | Aonuma ...................... 358/3.01 |
| 2010/0245853 A1 | 9/2010 | Aonuma |
| 2011/0317174 A1 * | 12/2011 | Shimahashi .................. 358/1.1 |

FOREIGN PATENT DOCUMENTS

| JP | 2001-069347 A | 3/2001 |
| JP | 2010-234686 A | 10/2010 |
| JP | 2012-065098 A | 3/2012 |

* cited by examiner

Primary Examiner — Mark Zimmerman
Assistant Examiner — Michael Burleson
(74) Attorney, Agent, or Firm — Scully, Scott, Murphy and Presser, P.C.

(57) ABSTRACT

A control device includes a first dither matrix having threshold values assigned to a plurality of cells. The control device converts image data into binary data by using the first dither matrix. The control device converts an input value into ON-pixel or OFF-pixel based on the threshold value. The threshold values in the first dither matrix are arranged such that the ON-pixels grow from a first group of ON-pixels to a second group of ON-pixels as the input value increases. The first group corresponds to cells arranged in M rows and N columns. The second group corresponds to cells arranged in (M+1) rows and (N+1) columns. The second group consists of the first group and a third group corresponding to (M+N+1) number of cells. At least two of the (M+N+1) number of cells are adjacent to each other and have same threshold values.

11 Claims, 10 Drawing Sheets

FIG. 2  STANDARD DITHER MATRIX

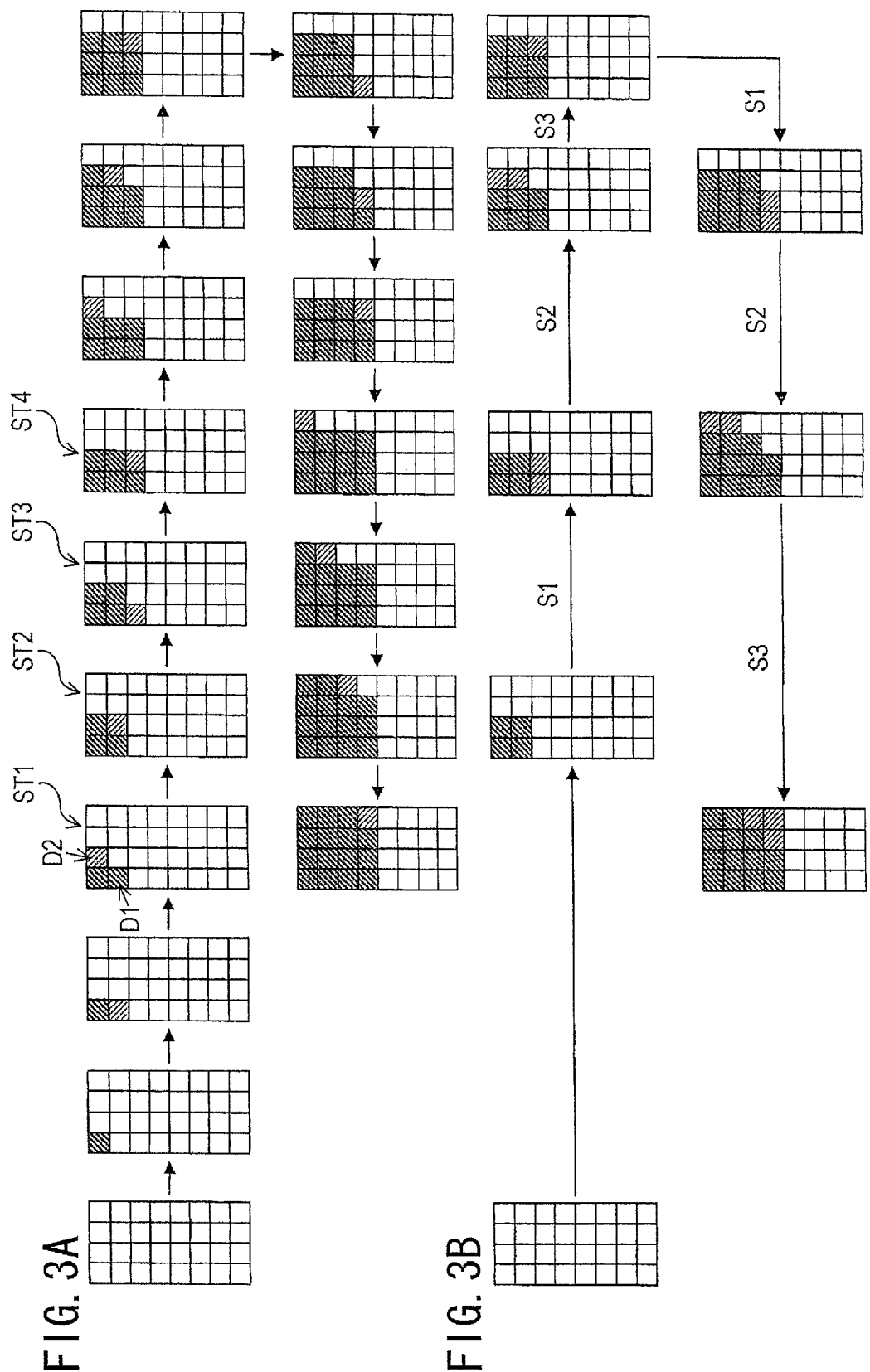

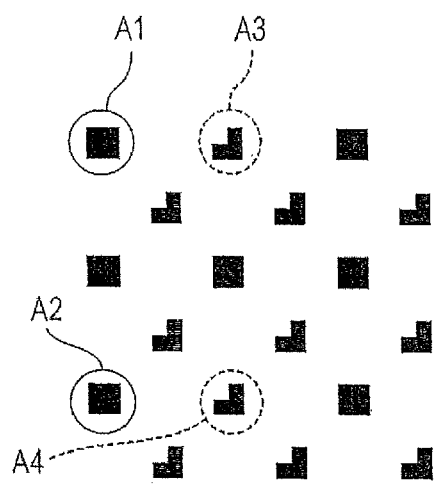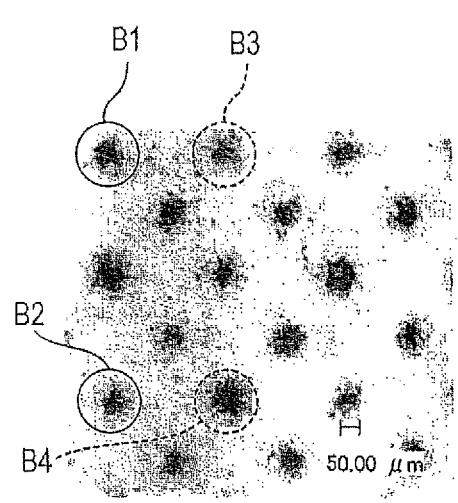
FIG. 4A BINARY IMAGE DATA
FIG. 4B PRINTING RESULT USING PULVERIZED TONER

FIG. 5  IRREGULAR DITHER MATRIX

FIG. 9  IRREGULAR DITHER MATRIX

CONTROL DEVICE CAPABLE OF GENERATING BINARY IMAGE DATA EXPRESSING SUITABLE GRADATION LEVELS

CROSS REFERENCE TO RELATED APPLICATION

This application claims priority from Japanese Patent Application No. 2012-027584 filed Feb. 10, 2012. The entire content of the priority application is incorporated herein by reference.

TECHNICAL FIELD

The present invention relates to a control device.

BACKGROUND

Binary image data used in a printing process is generated by a conventional printer.

SUMMARY

However, the conventional printer executing the printing process based on the binary image data may not be able to reproduce certain densities based on the gradation levels specified in the binary image data.

In view of the foregoing, it is an object of the present invention to provide a technique for generating binary image data capable of expressing suitable gradation levels.

In order to attain the above and other objects, the invention provides a control device including a processor and a memory. The memory stores computer program that, when executed by the processor, causes the control device to function as an image acquiring unit and a converting unit. The image acquiring unit is configured to acquire image data having an input value. The converting unit is configured to convert the image data into binary data by using a first dither matrix. The binary data is used in a printing process. The first dither matrix includes a plurality of threshold values assigned to a plurality of cells. Each of the plurality of cells is assigned respective one of the plurality of threshold values. The converting unit converts the input value into one of ON-pixel and OFF-pixel for each of the plurality of cells by comparing the input value with the respective one of the plurality of threshold values. The ON-pixel is a pixel set to an ON state, The OFF-pixel is a pixel set to an OFF state. The plurality of threshold values in the first dither matrix are arranged such that the ON-pixels grow from a first group of ON-pixels to a second group of ON-pixels as the input value increases. The ON-pixels in the first group correspond to cells arranged in M rows and N columns. M is a natural number. N is a natural number. The ON-pixels in the second group correspond to cells arranged in (M+1) rows and (N+1) columns. The second group of the ON-pixels consists of the first group of ON-pixels and a third group of ON-pixels. The third group of ON-pixels corresponds to (M+N+1) number of cells. At least two of the (M+N+1) number of cells are adjacent to each other and have same threshold values.

According to another aspect, the present invention provides a non-transitory computer-readable medium storing a set of program instructions thereon that, when executed by a computer, causes the computer to perform operations. The operations include: acquiring image data having an input value; and converting the image data into binary data by using a first dither matrix, the binary data being used in a printing process, the first dither matrix including a plurality of threshold values assigned to a plurality of cells, each of the plurality of cells being assigned respective one of the plurality of threshold values, the input value being converted into one of ON-pixel and OFF-pixel for each of the plurality of cells by comparing the input value with the respective one of the plurality of threshold values, the ON-pixel being a pixel set to an ON state, the OFF-pixel being a pixel set to an OFF state, the plurality of threshold values in the first dither matrix being arranged such that the ON-pixels grow from a first group of ON-pixels to a second group of ON-pixels as the input value increases, the ON-pixels in the first group corresponding to cells arranged in M rows and N columns, M being a natural number, N being a natural number, the ON-pixels in the second group corresponding to cells arranged in (M+1) rows and (N+1) columns, the second group of the ON-pixels consisting of the first group of ON-pixels and a third group of ON-pixels, the third group of ON-pixels corresponding to (M+N+1) number of cells, at least two of the (M+N+1) number of cells being adjacent to each other and having same threshold values.

According to another aspect, the present invention provides a control method including: acquiring image data having an input value; and converting the image data into binary data by using a first dither matrix, the binary data being used in a printing process, the first dither matrix including a plurality of threshold values assigned to a plurality of cells, each of the plurality of cells being assigned respective one of the plurality of threshold values, the input value being converted into one of ON-pixel and OFF-pixel for each of the plurality of cells by comparing the input value with the respective one of the plurality of threshold values, the ON-pixel being a pixel set to an ON state, the OFF-pixel being a pixel set to an OFF state, the plurality of threshold values in the first dither matrix being arranged such that the ON-pixels grow from a first group of ON-pixels to a second group of ON-pixels as the input value increases, the ON-pixels in the first group corresponding to cells arranged in M rows and N columns, M being a natural number, N being a natural number, the ON-pixels in the second group corresponding to cells arranged in (M+1) rows and (N+1) columns, the second group of the ON-pixels consisting of the first group of ON-pixels and a third group of ON-pixels, the third group of ON-pixels corresponding to (M+N+1) number of cells, at least two of the (M+N−1) number of cells being adjacent to each other and having same threshold values.

BRIEF DESCRIPTION OF THE DRAWINGS

The particular features and advantages of the invention as well as other objects will become apparent from the following description taken in connection with the accompanying drawings, in which:

FIG. 2 is an explanatory diagram showing an example of a standard dither matrix stored in the control device;

FIG. 3A is an explanatory diagram showing a feature of the standard dither matrix;

FIG. 3B is an explanatory diagram showing a feature of an irregular dither matrix stored in the control device;

FIG. 4A is an explanatory diagram showing binary image data having a plurality of sizes of dots;

FIG. 4B is an explanatory diagram showing a printing results obtained by printing the binary image data shown in FIG. 4A;

FIG. 5 is an explanatory diagram showing an example of the irregular dither matrix stored in the control device according to the first embodiment;

FIG. 9 is an explanatory diagram showing an example of an irregular dither matrix stored in the control device according to the second embodiment;

DETAILED DESCRIPTION

Figure 1:
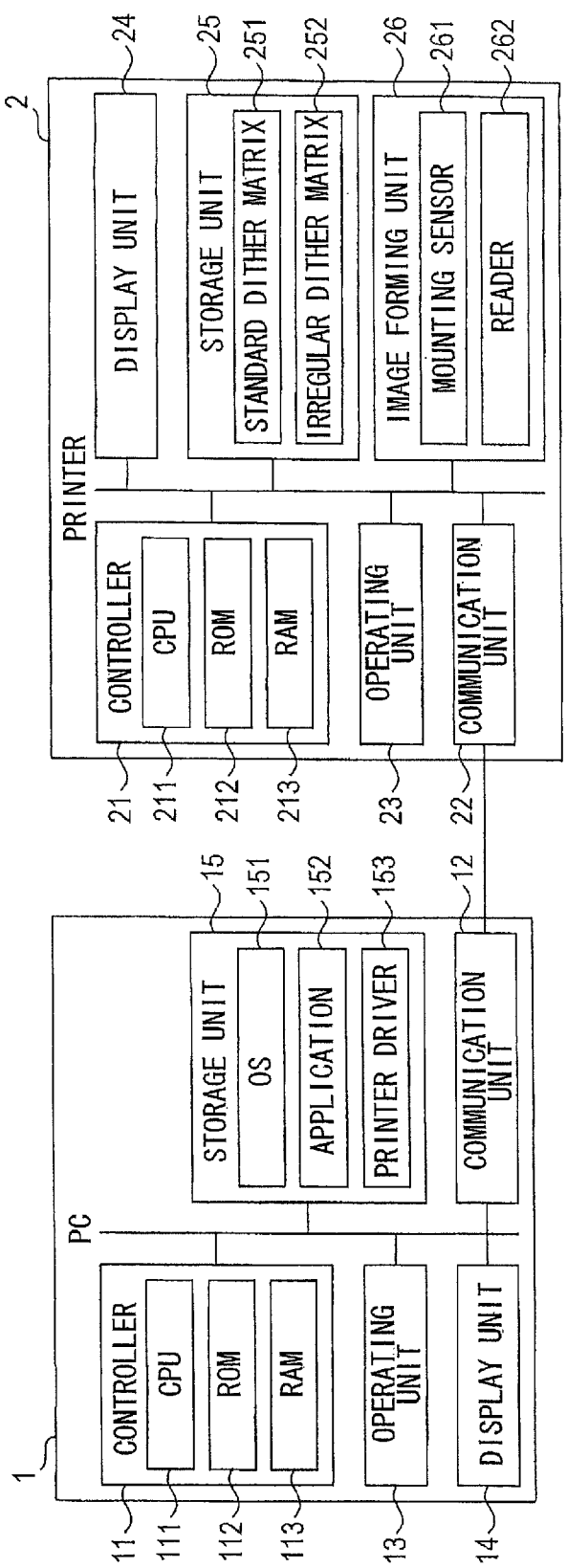
FIG. 1 is a block diagram showing an image processing system including a control device according to a first embodiment of the present invention.

FIG. 1 is a block diagram showing the general structure of a printing system including a personal computer (PC) 1, and a printer 2 that are capable of performing data communications with each other.

The PC 1 is a common data processor that includes a controller 11, a communication unit 12, an operating unit 13, and a display unit 14, and a storage unit 15. The controller 11 performs overall control of each component in the PC 1. The controller 11 includes a CPU 111, a ROM 112, and a RAM 113.

The communication unit 12 is an interface for performing data communications with the printer 2. The operating unit 13 is an input device that allows the user to input instructions through external operations. In this embodiment, a keyboard and a pointing device (a mouse, touchpad, or the like) are used as the operating unit 13, The display unit 14 is an output device for displaying various data in a visual form that the user can understand. In this embodiment, a liquid crystal display is used as the display unit 14.

The storage unit 15 is a nonvolatile storage device for storing data that can be overwritten. In this embodiment, a hard disk drive is employed as the storage unit 15. Various software programs are installed on the storage unit 15, including an operating system (OS) 151; application programs 152 for implementing graphical program and other applications (so-called software); and a printer driver 153 for enabling a user to use the printer 2 through the PC 1.

The printer 2 is an electrographic-type image forming device including a controller 21, a communication unit 22, an operating unit 23, a display unit 24, a storage unit 25, and an image forming unit 26.

The controller 21 is configured to perform overall control of each component in the printer 2. The controller 21 includes a CPU 211, a ROM 212, and a RAM 213. The communication unit 22 is an interface for performing data communications with the PC 1. The operating unit 23 is an input device that allows the user to input instructions through external operations. The operating unit 23 includes various operating buttons and keys. The display unit 24 is an output device and includes a small liquid crystal display for displaying various data as images that convey information to the user.

Figure 2:
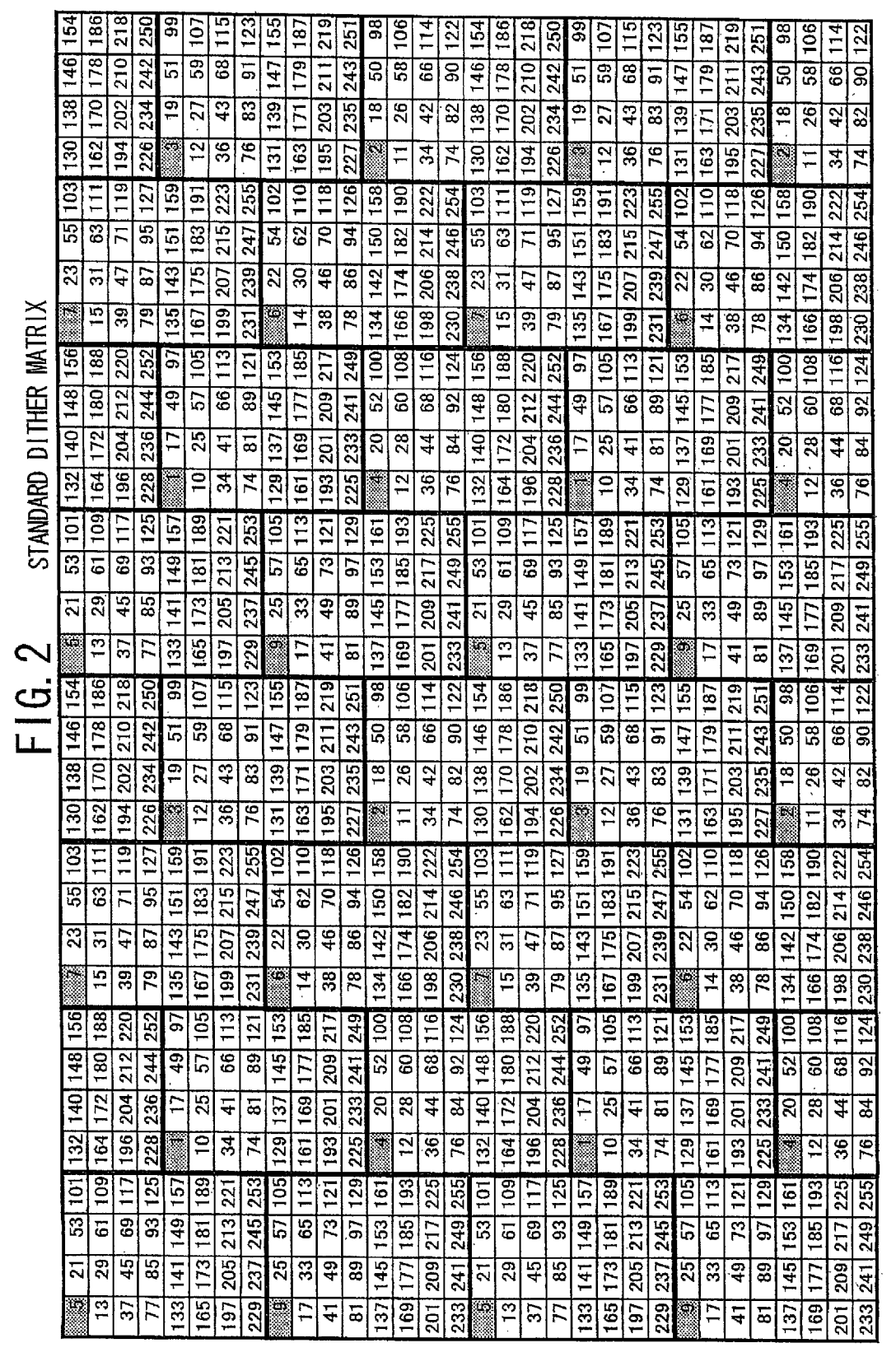

The storage unit 25 is a nonvolatile storage device for storing data that can be overwritten. In the first embodiment, the storage unit 25 is configured of flash memory. The storage unit 25 stores dither matrices (matrices having a threshold value set for each cell) as candidates to be selected for use in a thresholding process based on a dither method. The dither matrices include a standard dither matrix 251 and an irregular dither matrix 252, The standard dither matrix 251 shown in FIG. 2 is a 32×32 clustered-dot dither matrix having 32 cells arranged both horizontally and vertically and is configured of a plurality of 4×8 sub-matrices. Each sub-matrix has threshold values arranged so that one pixel at a time is sequentially set to an ON state beginning from a starting cell (the cell in the upper left corner in this example) as the input value increases, and so that a set of pixels in the ON state (hereinafter referred to as "ON pixels") grow as a single dot. The threshold values in the standard dither matrix 251 are arranged to achieve optimum image reproduction when using a genuine toner product for which characteristics are known (that is, toner supplied by the manufacturer of the printer 2; hereinafter referred to as "genuine toner").

The irregular dither matrix 252 is provided for use of non-genuine toner (hereinafter referred to as "third party toner") and will be described later in greater detail.

Figure 6:
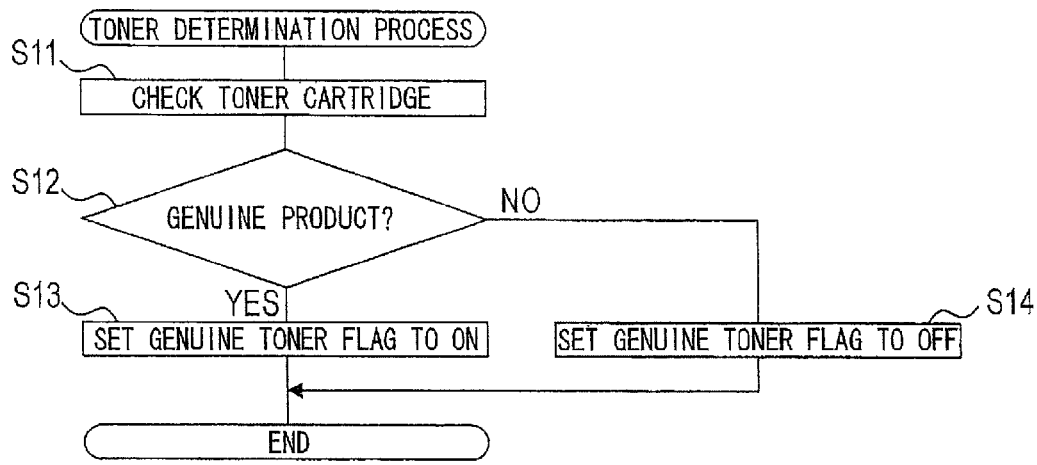
FIG. 6 is a flowchart illustrating steps in a toner determination process executed by the control device according to the first embodiment.

The storage unit 25 also stores programs for instructing the controller 21 (and specifically the CPU 211) to implement a toner determination process (see FIG. 6) and a print job reception process (see FIG. 7), both of which will be described later.

The image-forming unit 26 functions to form monochrome images by fixing toner to paper. More specifically, the image-forming unit 26 irradiates a laser beam onto the uniformly charged surface of a photosensitive drum based on binary image data in order to form an electrostatic latent image of the binary image. Next, the image-forming unit 26 deposits toner on the electrostatic latent image to form a toner image. The image-forming unit 26 transfers this toner image onto a sheet of paper conveyed on a conveying belt and fixes the toner image to the paper by heat in a fixing unit to complete the image-forming (printing) process.

The printer 2 according to the first embodiment employs a toner cartridge that is detachably mounted in the body of the printer 2. The toner cartridge accommodates toner and can be replaced by the user as needed. An IC chip is attached to the original manufacturer's toner cartridge. The IC chip stores information indicating that the toner cartridge is a genuine product.

The image-forming unit 26 also includes a mounting sensor 261 for detecting when the toner cartridge is mounted in the body of the printer 2, and a reader 262 for reading information stored in the IC chip of the toner cartridge. Accordingly, the controller 21 of the printer 2 can determine whether the toner cartridge mounted in the printer 2 is a genuine product based on information read by the reader 262 of the image-forming unit 26.

1-2. Overview of Processes Performed in the Printing System of the First Embodiment When the user of the PC 1 performs an operation to initiate a printing process in one of the application programs 152 executing on the PC 1, the PC 1 activates the printer driver 153 to transfer a print job to the printer 2. Here, a print job is a command to print 256-level (an 8-bit range of values between 0 and 255) image data representing the image to be printed. When the printer 2 receives a print job from the PC 1, the controller 21 of the printer 2 executes a thresholding process using a dither matrix to convert image data related to the print job to binary image data. Subsequently, the printer 2 outputs the binary image data to the image-forming unit 26, and the image-forming unit 26 uses toner to form a binary image represented by the binary image data on paper.

The printer 2 is designed to achieve its maximum performance using genuine toner (a polymer toner in the first embodiment). Hence, if the printer 2 uses a third party toner for which the properties are unknown, problems often occur when charging or fixing the toner, making it difficult for the printer 2 to produce satisfactory printing results. In particular, if the third party toner is a pulverized toner, dot formation may be unstable because the particle size of pulverized toner can vary greatly. Thus, the quality of images printed with this toner could be poor if the thresholding process were performed using the standard dither matrix 251 designed for use with genuine toner. Further, the fixing properties of the toner are poorest in light regions (regions with low input values) of an image in which only a small number of pixels constitute each dot.

Threshold values in the standard dither matrix 251 shown in FIG. 2 are arranged so that the dot formed in each sub-matrix (the set of ON pixels) grows one pixel at a time as the input value increases, beginning from a 1×1-pixel starting dot constituting a single ON pixel, as shown in the example of FIG. 3A. Specifically, the dot in the sub-matrix grows one pixel at a time by sequentially setting one pixel currently in an OFF state (an "OFF pixel") that neighbors an ON pixel horizontally or vertically to the ON state, one pixel at a time.

For example, all ON pixels in the four-pixel (2×2) dot of state ST2 shown in FIG. 3A and all ON pixels in the six-pixel (2×3) dot of state ST4 neighbor at least two other ON pixels horizontally or vertically. Dots formed in this way allow for improved stability in fixing toner in the printing process. However, the dot formation process produces ON pixels that neighbor only one other ON pixel (a single-pixel projection), as in the three-pixel dot of state ST1 in FIG. 3A and the five-pixel dot in state ST3. Two of the three ON pixels (D1 and D2) constituting the set of ON pixels in state ST1 neighbor only one other ON pixel. Dots formed in this way give rise to instability for fixing toner.

FIG. 4A shows binary image data having a mixture of dots comprising three ON pixels (the set of ON pixels formed in state ST1 of FIG. 3A, for example) and dots comprising four ON pixels (the set of ON pixels formed in state ST2 of FIG. 3A, for example). FIG. 4B shows the printing results obtained by printing the binary image data in FIG. 4A using a third party pulverized toner. The result of printing four-pixel dots A1 and A2 in FIG. 4A are dots B1 and B2 in FIG. 4B, while the result of printing three-pixel dots A3 and A4 in FIG. 4A are dots B3 and B4 in FIG. 4B. Among the printed dots B3 and B4, dot B3 has been formed smaller than dot B1, while dot B4 has been formed larger than dot B2. From these results, it is clear that three-pixel dots formed with toner tend to vary in size. Consequently, the size of dots formed with third party toner is not stable, particularly in light regions of an image, and the quality of the printed image tends to suffer as a result.

Figure 5:
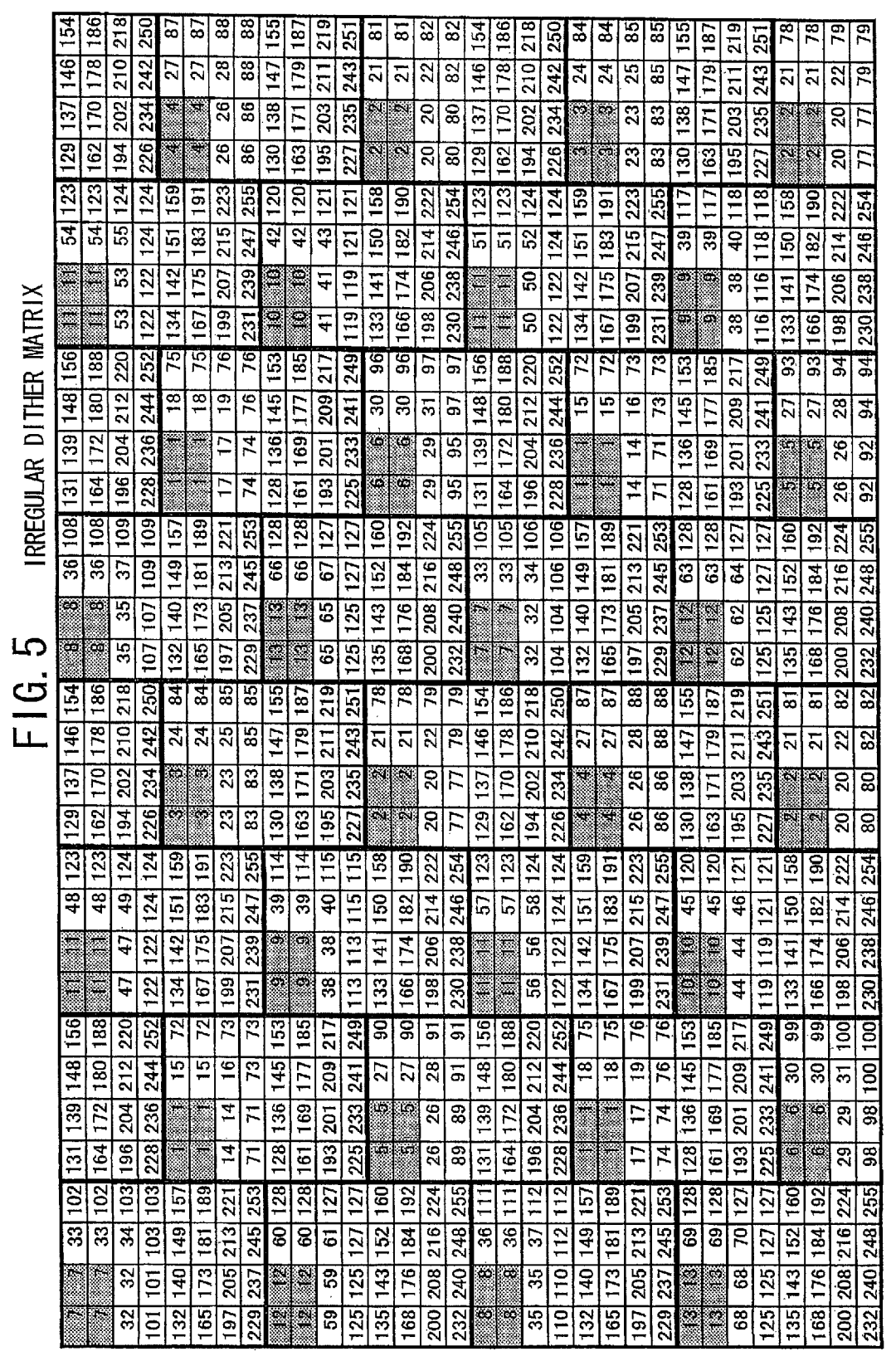

Therefore, when performing a printing process with third party toner, the printer 2 according to the first embodiment uses the irregular dither matrix 252 shown in FIG. 5 in place of the standard dither matrix 251 in FIG. 2. As with the standard dither matrix 251, the irregular dither matrix 252 is a 32×32 clustered-dot dither matrix. Threshold values are arranged in the irregular dither matrix 252 so that the following conditions A-C remain satisfied until the dots (ON-pixels) in all sub-matrices have grown to 4×4 size, Satisfying conditions A and C is what differentiates the irregular dither matrix 252 from the standard dither matrix 251.

Condition A

The minimum size of a dot is 2×2. Hence, dots initially grow from a 2×2-size starting dot. Specifically, four cells in the upper left corner of each sub-matrix constituting the irregular dither matrix 252 serve as the starting cells. The four cells are arranged in a 2×2 square corresponding to four pixels and are given the same threshold value, which is the smallest value in the respective sub-matrix. In other words, the smallest threshold value in each sub-matrix is assigned to at least two cells adjacent to each other.

Condition B

A J×J-size dot (where J is a natural number; in the example of FIG. 5, J is 2 or 3) grows to a (J+1)×(J+1)-size dot as the input value increases. That is, the dot in each sub-matrix grows by increasing the set of ON pixels constituting the dot by one line in each of the horizontal and vertical directions. In the following description, the lines of ON pixels newly generated in the process of growing a dot from the J×J size to the (J+1)×(J+1) size will be called "new lines."

Condition C

As a dot grows from J×J size to (J+1)×(J+1) size, two adjacent pixels on a new line extending horizontally ((1, J+1) and (2, J+1)) are simultaneously set to ON. Similarly, two adjacent pixels on a new line extending vertically ((J+1, 1) and (J+1, 2)) are simultaneously set to ON. More specifically, a cell row forming a new line extending horizontally in the irregular dither matrix 252 includes two neighboring cells having the same thresholding value (a first threshold value). Similarly, a cell column forming a new line extending vertically includes two neighboring cells having the same threshold value (a second threshold value). In other words, a second group of ON-pixels corresponding to (J+1)×(J+1) cells consists of a first group of ON-pixels corresponding to J×J cells and a third group of ON-pixels corresponding to (J+J+1) number of cells. At least two of the (J+J+1) number of cells are adjacent to each other and have same threshold values.

However, a particular restriction of the first embodiment is that both the first and second threshold values may not be set in cells corresponding to both the new line extending horizontally and the new line extending vertically. In the example of FIG. 5, the first threshold value and second threshold value are set to different values, but there is no particular restriction on the size relationship between the first and second threshold values (i.e., the first threshold value may be greater than the second threshold value, less than the second threshold value, or equal to the second threshold value).

Note that the coordinates (x, y) for pixels expressed in the above description, such as (1, 1+1), indicate the relative position of the pixel to a reference pixel having x and y coordinates (1, 1). Here, the reference pixel is the pixel positioned in a corner of the dot (the upper left corner in the first embodiment) of any size as the dot grows from J×J size to (J+1)×(J+1) size. Further, the coordinates of a pixel adjacent to the reference pixel in the horizontal direction (rightward in the first embodiment, but the same process may be used for pixels neighboring the reference pixel to the left) is expressed as (2, 1) and the coordinates of the pixel neighboring this pixel horizontally is expressed as (3, 1). Similarly, the coordinates of a pixel neighboring the reference pixel vertically (downward in the first embodiment, but the same process may be used for pixels neighboring the reference pixel on the top) is expressed as (1, 2) and the coordinates of the pixel neighboring this pixel vertically is expressed as (1, 3). Hence, x and y coordinates of pixels constituting a J×J-size dot are expressed by values 1-J.

Based on the above conditions, dots in the irregular dither matrix 252 are formed according to the following steps until a 4×4-size dot has been formed in all sub-matrices, as illustrated in FIG. 3B.

In a first step (S1) of the process for growing a dot from 2×2 size to 3×3 size, two adjacent pixels among the three pixels falling on the new horizontal line but not on the new vertical line (i.e., (1, 3) and (2, 3)) are simultaneously set to ON. In other words, the two pixels that exist at positions for forming a one-pixel extension to the 2×2 dot in the vertical direction (downward in this example) are simultaneously set to ON.

In a second step (S2), the two adjacent pixels among the three pixels constituting the new vertical line but not falling on the new horizontal line (i.e., (3, 1) and (3, 2)) are simultaneously set to ON. In other words, the two pixels that exist at positions for forming a one-pixel extension to the 2×2 dot in the horizontal direction (rightward in this example) are simultaneously set to ON.

In a third step (S3), the remaining pixel required to complete the 3×3-size dot (i.e., pixel (3, 3) on the new line extending horizontally and the new line extending vertically) is set to ON.

Similarly, in a first step (S1) for growing the dot from 3×3 size to 4×4 size, two adjacent pixels within three of the four pixels falling on the new horizontal line but not on the new vertical line (i.e., pixels (1, 4) and (2, 4)) are simultaneously set to ON. In a second step (S2), two adjacent pixels within three of the four pixels falling on the new vertical line but not on the new horizontal line (i.e., pixels (4, 1) and (4, 2)) are simultaneously set to ON. In a third step (S3), the remaining three pixels required to complete the 4×4-size dot (i.e., the single pixel falling on both the new horizontal line and new vertical line and the two pixels neighboring this pixel vertically and horizontally; specifically, pixels (4, 4), (4, 3), and (3, 4)) are simultaneously set to ON.

Note that when a plurality of pixels is set to ON in the third step (S3) in the first embodiment, the pixels set to ON in the first and second steps are selected so that the pixels set to ON in the third step are not separated from each other in either the horizontal or vertical directions. In other words, when growing the dot from M×N size to (M+1)×(N+1) size, the same threshold values are provided in cells from (1, N+1) to (X, N+1) (where X is a natural number satisfying X≤M+1) in the first step and the same threshold values are provided in cells from (M+1, 1) to (M+1, Y) (where Y is a natural number satisfying the expression Y≤N+1) in the second step. For example, if the second and third pixels from the left edge on the new horizontal line (pixels (2, 4) and (3, 4)) are set to ON in the first step of the process to grow the dot from the 3×3 size to the 4×4 size, then the three pixels set to ON in the third step would be separated between two locations. Since this case can reduce toner fixability by forming more corner parts (missing parts) in dots, threshold values are arranged in the irregular dither matrix 252 of the first embodiment to prevent the separation of ON pixels in the third step.

As shown in FIG. 3B, during the process of growing a dot up to 4×4 size using the irregular dither matrix 252, all ON pixels configuring the dot are adjacent to two or more other ON pixels in either the horizontal or vertical direction. In other words, the irregular dither matrix 252 does not produce an ON pixel adjacent to only one other ON pixel (a single-pixel projection). Accordingly, the size of dots formed in light regions of an image tend to be more stable, even when using third party toner in the printing process.

Note that the threshold values in the irregular dither matrix 252 are set so as to grow dots one pixel at a time, as with the standard dither matrix 251, after the dots in all sub-matrices have grown to the 4×4 size, Further, threshold values between 1 and 255 are arranged in the irregular dither matrix 252 so that the difference between neighboring values is small. This arrangement is designed to suppress large jumps in tone gradations in large coverage areas of an image in response to input values 0-255.

1-3. Detailed Description of Processes Performed in the Printing System of the First Embodiment Next, a toner determination process executed by the controller 21 of the printer 2 (and specifically the CPU 211) will be described with reference to the flowchart in FIG. 6. The controller 21 begins the toner determination process when the power to the printer 2 is turned on, or when the mounting sensor 261 detects that a toner cartridge was mounted in the printer 2 while the printer 2 is on (when the mounting sensor 261 detects that a toner cartridge has been replaced).

In S11 at the beginning of the toner determination process, the controller 21 reads information related to the currently mounted toner cartridge from the IC chip attached to the cartridge. In this way, the controller 21 acquires information for determining whether the toner cartridge is a genuine product.

In S12 the controller 21 determines whether the currently mounted toner cartridge is a genuine product based on the information acquired in S11. If the controller 21 determines that the toner cartridge is a genuine product (S12: YES), in S13 the controller 21 sets a genuine toner flag to ON, and subsequently ends the toner determination process of FIG. 6. However, if the controller 21 determines that the toner cartridge is not a genuine product (i.e., is third party toner; S12: NO), in S14 the controller 21 sets the genuine toner flag to OFF, and subsequently ends the toner determination process. Here, the genuine toner flag functions simply to indicate whether the toner cartridge is a genuine product.

Figure 7:
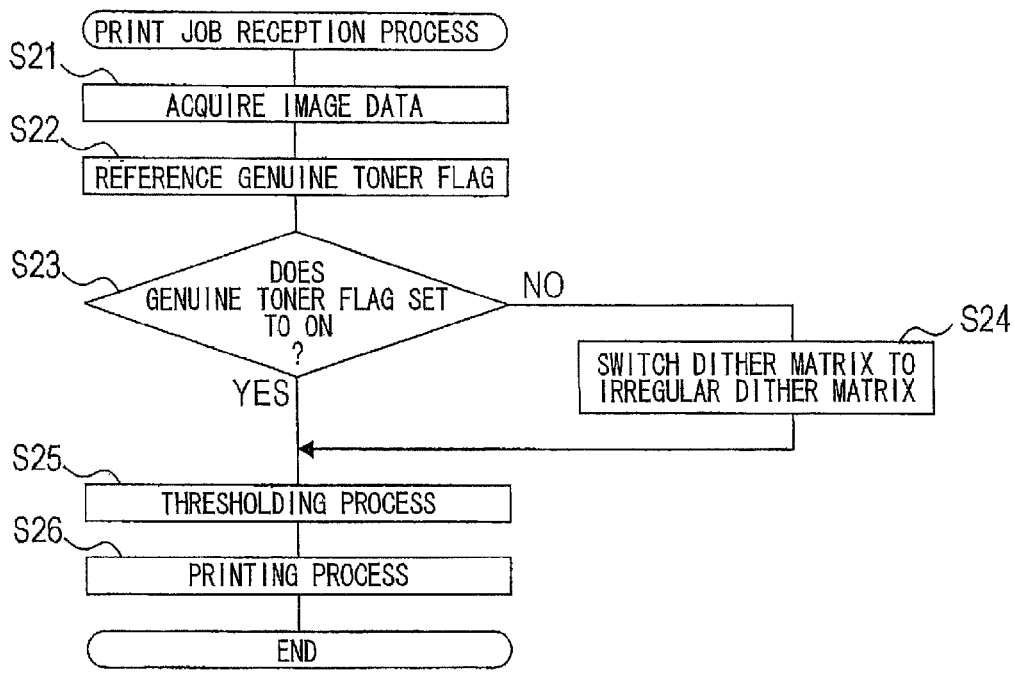
FIG. 7 is a flowchart illustrating steps in a print job reception process executed by the control device according to the first embodiment.

Next, a print job reception process executed by the controller 21 of the printer 2 (and specifically the CPU 211) will be described with reference to the flowchart in FIG. 7. The controller 21 executes the print job reception process each time the print job is received from the PC 1. At the beginning of the print job reception process, the standard dither matrix 251 is set as the default dither matrix to be used in the thresholding process.

In S21 at the beginning of the print job reception process, the controller 21 acquires image data related to the print job transmitted from the PC 1. In S22 the controller 21 references the genuine toner flag in order to determine whether the toner cartridge currently mounted in the printer 2 is a genuine product. In S23 the controller 21 determines whether the genuine toner flag is ON based on the information referenced in S22.

If the controller 21 determine that the genuine toner flag is ON (S23: YES), then the controller 21 advances to S25 and S26 to execute the thresholding process and printing process, respectively. More specifically, in the thresholding process, the controller 21 converts the image data related to the print job to binary image data, which can be used for executing a printing process, using the standard dither matrix 251 as the prescribed dither matrix, Next, in the printing process, the controller 21 prints a binary image represented by the binary image data generated in the thresholding process to form a toner image on paper. Subsequently, the controller 21 ends the print job reception process of FIG. 7.

However, if the controller 21 determines in S23 that the genuine toner flag is OFF (S23: NO), then in S24 the controller 21 first switches the prescribed dither matrix to the irregular dither matrix 252 for use with third party toner before executing the thresholding process and printing process of S25 and S26, respectively. In other words, the controller 21 selects the irregular dither matrix 252 and converts the image data into binary data by using the irregular dither matrix 252. In this case, the controller 21 converts the image data related to the print job to binary image data in the thresholding process using the irregular dither matrix 252. After completing the printing process, the controller 21 ends the print job reception process.

1-4. Effects of the First Embodiment

As described above, the PC 1 according to the first embodiment can form dots (sets of ON pixels) constituting binary image data capable of rendering suitable gradations by performing a thresholding process on image data using the irregular dither matrix 252. Therefore, the PC 1 can produce binary image data expressing suitable gradations in order to prevent a drop in quality of the printed image that can result from using third party toner in the printing process.

Specifically, the PC 1 selects the standard dither matrix 251 when using genuine toner in the printing process and selects the irregular dither matrix 252 when using third party toner. Hence, the PC 1 of the preferred embodiment can execute a thresholding process using a suitable dither matrix, both for cases in which third party toner is being used in the printing process and cases in which genuine toner is being used in the printing process.

Further, since the starting dot in the irregular dither matrix 252 is configured of four neighboring cells set to the same thresholding value, the PC 1 can reduce a drop in image quality in regions with low gradations. In particular, since the PC 1 begins with a dot having the same number of pixels horizontally and vertically and grows from this starting point one pixel at a time in the horizontal and vertical directions, the dots formed in toner are not prone to irregularity.

2. Second Embodiment 2-1. Differences from the First Embodiment

Figure 8:
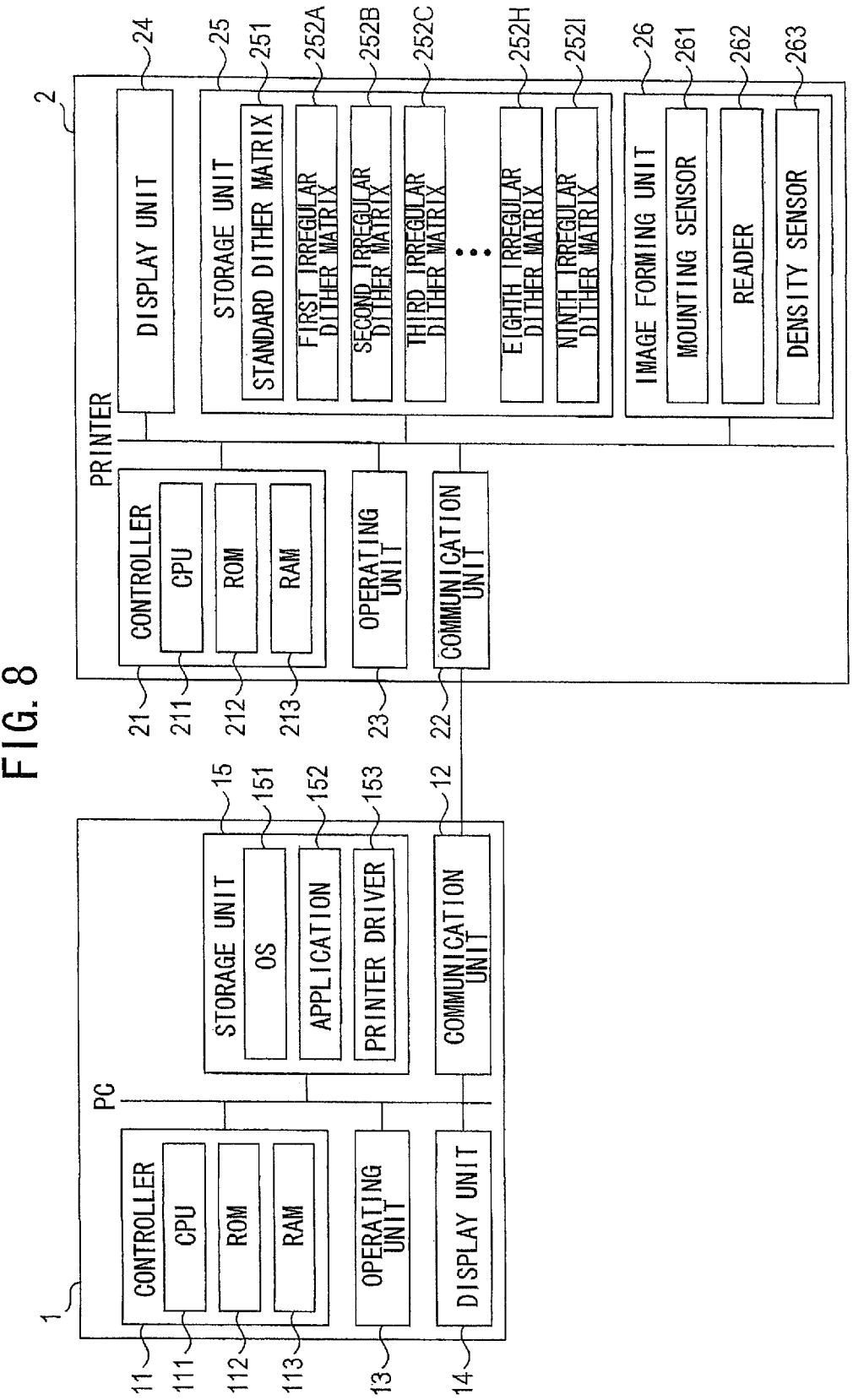
FIG. 8 is a block diagram showing an image processing system including a control device according to a second embodiment of the present invention.

FIG. 8 is a block diagram showing the configuration of a printing system according to a second embodiment of the present invention. While similar to the first embodiment, the printing system according to the second embodiment employs a different method of selecting the dither matrix to be used in the thresholding process. While the printer 2 according to the first embodiment selected a dither matrix suited to the toner used in the printing process, the printer 2 according to the second embodiment first forms density patches with toner, and then selects a dither matrix suited to the detected density of the density patch. Points of the second embodiment that are common with the first embodiment will not be repeated in the following description.

2-2. Structure of the Printer

In the printer 2 according to the second embodiment, the storage unit 25 stores a plurality (nine in this example) of irregular dither matrices 252A-252I, rather than the single irregular dither matrix 252 described in the first embodiment. Each of the irregular dither matrices 252A-252I has threshold values set to satisfy the conditions A-C described in the first embodiment, but satisfies those conditions for differing ranges of input values.

Threshold values in the irregular dither matrix 252 according to the first embodiment are arranged to satisfy conditions A-C described above as dots grow to 4×4 size in all sub-matrices (i.e., the range of input values up to 127). In the process after the 4×4-size dots have been formed in all sub-matrices (i.e., for the range of input values greater than or equal to 128), threshold values are arranged to grow the dots one pixel at a time, as with the standard dither matrix 251 (i.e., no two neighboring pixels have the same threshold value for this range). Hence, the growth pattern is changed when dots of 4×4 size are formed in all sub-matrices. Below, the process of growing a dot prior to switching the growth pattern (the process that satisfied conditions A-C) will be called the "irregular growth process," while the process performed after the growth pattern has been changed (the process of growing the dots one pixel at a time) will be called the "standard growth process."

Figure 9:
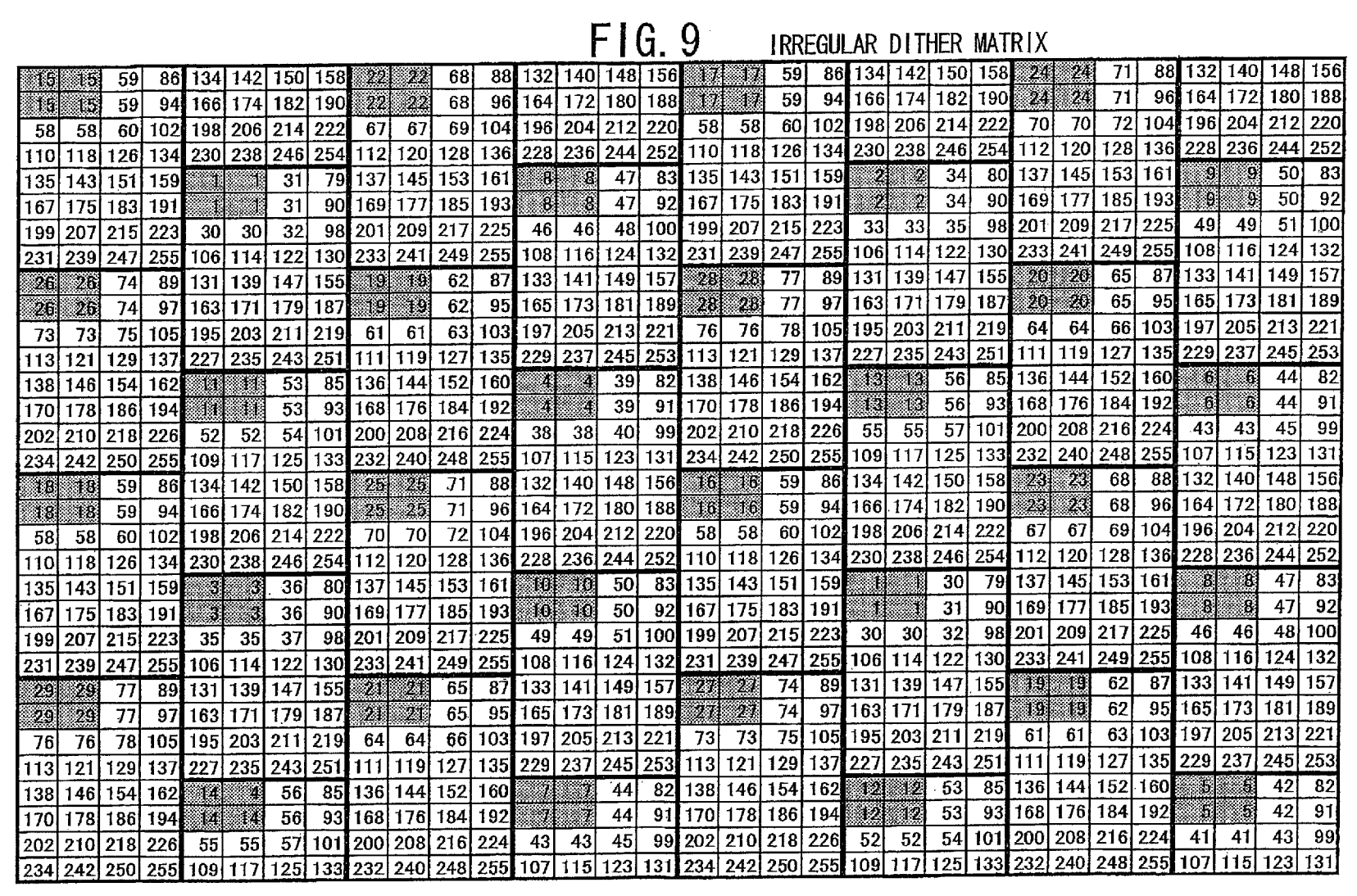

The overall size of the irregular dither matrix 252 shown in FIG. 9 and the size of its sub-matrices are identical to those of the irregular dither matrix 252 according to the first embodiment (see FIG. 5). However, the irregular dither matrix 252 in FIG. 9 differs from that described in the first embodiment in that threshold values are arranged so as to switch the growth pattern from the irregular growth process to the standard growth process at the stage when 3×3-size dots have been formed in all sub-matrices (when the input value is 78).

More specifically, with the irregular dither matrix 252 according to the first embodiment, the ratio of ON pixels to total pixels in each sub-matrix at the moment of switching growth patterns (hereinafter referred to as the "switching ratio") is 50%, while the switching ratio with the irregular dither matrix 252 shown in FIG. 9 is about 30%. Hence, the irregular dither matrix 252 shown in FIG. 9 has properties that more closely resemble the standard dither matrix 251 than the irregular dither matrix 252 according to the first embodiment since a smaller range of input values applies to the irregular growth process. Note that the growth process based on the standard dither matrix 251 does not include an irregular growth process.

The irregular dither matrices 252A-252I used in the second embodiment are configured to have different switching ratios. Specifically, the switching ratio differs among these dither matrices in increments of 10% from 10% to 90%. Hence, the first irregular dither matrix 252A has a switching ratio set to 10%, the second irregular dither matrix 252B a switching ratio of 20%, and so on up to the ninth irregular dither matrix 252I, which has a switching ratio of 90%. All of the irregular dither matrices 252A-252I are of the same size, and the threshold values in these dither matrices are configured to switch the growth process from the irregular growth process to the standard growth process at a stage corresponding to its switching ratio. Note that the switching ratios need not be varied precisely at 10% intervals, but may be set to values that approximate these ratios.

Further, the irregular dither matrix 252 shown in FIG. 9 is merely an example. For instance, the sub-matrices may be configured of a larger number of cells, and threshold values in the cells may be configured in order to switch the growth process from the irregular growth process to the standard growth process at the stage when dots in all sub-matrices have grown to a (2+k)×(2+k) size (where k is a natural number). Here, the switching ratio is a higher value when the value of k is larger and, hence, different switching ratios can be produced by varying the value of k in steps.

Figure 10A:
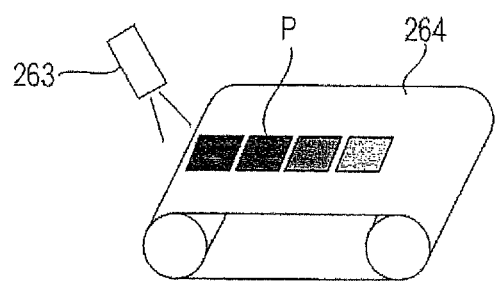
FIG. 10A is an explanatory diagram showing how to acquire measured values in the second embodiment.
Figure 10B:
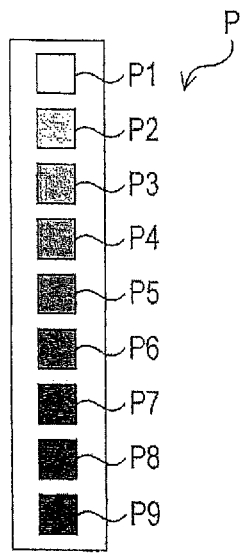
FIG. 10B shows a plurality of density patches formed by the control device in the second embodiment.

As shown in FIG. 8, the image-forming unit 26 according to the second embodiment is also provided with a density sensor 263. As shown in FIG. 10A, the density sensor 263 is disposed in the printer 2 and functions to measure the densities of density patches P formed on a conveying belt 264 in the image-forming unit 26. That is, the image-forming unit 26 executes a process described later in which nine density patches P1-P9 are directly formed on the conveying belt 264 in toner. As shown in FIG. 10B, the density patches P1-P9 represent nine levels of density varied at 10% increments from 10% density to 90% density. After the image-forming unit 26 forms the density patches P1-P9 on the conveying belt 264, the density sensor 263 measures the densities of the patches. Once the density sensor 263 has measured the densities, a cleaning member (not shown) provided in the image-forming unit 26 recovers the toner from the conveying belt 264.

2-3. Detailed Description of Processes Performed in the Printing System of the Second Embodiment Next, a print job reception process according to the second embodiment will be described with reference to the flowchart in FIG. 11. This print job reception process is executed by the control unit 21 of the printer 2 (and more specifically the CPU 211) in place of the toner determination process (FIG. 6) and the print job reception process (FIG. 7) according to the first embodiment. As in the first embodiment, the control unit 21 begins this print job reception process upon receiving a print job from the PC 1. At the beginning of this process, the standard dither matrix 251 is set as the default dither matrix to be used for the thresholding process.

Figure 11:
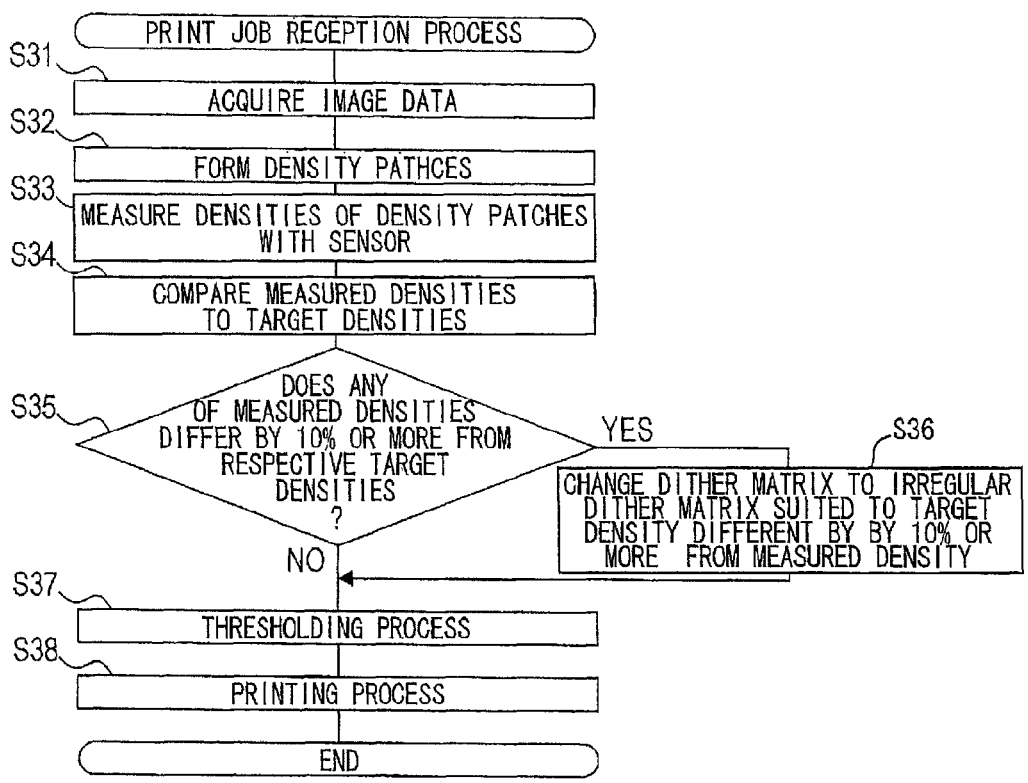
FIG. 11 is a flowchart illustrating steps in a print job reception process executed by the control device according to the second embodiment.

In S31 at the beginning of the print job reception process of FIG. 11, the control unit 21 acquires image data related to the print job transmitted from the PC 1. In S32 the control unit 21 forms the nine density patches P1-P9 directly on the conveying belt 264 in toner. In S33 the control unit 21 controls the density sensor 263 to measure the densities of the density patches P1-P9.

In S34 the control unit 21 compares the measured densities acquired from the density sensor 263 (actual values) to the densities expected to be found from the density patches P1-P9 (target values). In S35 the control unit 21 determines whether any of the density patches P1-P9 was not formed properly. In the second embodiment, a density patch that was not formed properly has an actual value that differs by 10% or more from the target value.

If the control unit 21 determines that all density patches were formed properly (S35: NO), then the control unit 21 advances to perform the thresholding process and printing process in S37 and S38, respectively. In the thresholding process, the control unit 21 converts image data related to the print job to binary image data, which is used for executing the printing process, using the standard dither matrix 251. In the printing process, the control unit 21 prints a binary image represented by the binary image data generated in S37 in toner on paper, and subsequently ends the print job reception process of FIG. 11.

However, if the control unit 21 determines that there exists even one density patch that was not formed properly (S35: YES), in S36 the control unit 21 changes the dither matrix used for the thresholding process to one of the irregular dither matrices 252A-252I designed for third party toner. More specifically, the control unit 21 selects one of the irregular dither matrices 252A-252I suited to the density of the patch having the highest density among those density patches that were not formed properly, In other words, the control unit 21 selects the first irregular dither matrix 252A if the highest density among patches that were not formed properly is 10%, selects the second irregular dither matrix 252B if the highest density among the patches is 20%, and selects the ninth irregular dither matrix 252I if the highest density among the patches is 90%.

The irregular dither matrix is selected based on the highest density among density patches that were not formed properly because the difference between the target value and the actual value tends to be larger for patches having lower densities. As described earlier, the sizes of dots formed in toner become less stable, i.e., tend to vary more, in lighter regions of images. Hence, if the density patch at 30% density was not formed properly, then it is likely that density patches at 20% and 10% density were also not formed properly. However, the density patch used to select the irregular dither matrix 252 may be chosen on the condition that all density patches of lower density than that of the selected density patch were also not formed properly. For example, if density patches of 10-30% and 60% were not formed properly, but density patches of 40-50% and 70-90% were formed properly, then the density patch used for selecting the irregular dither matrix 252 in this method is not the 60% density patch (the highest density in this example), but rather the patch having a density of 30% since all patches of lower density were also not formed properly. In this case, the third irregular dither matrix 252C of the second embodiment would be chosen. This method has the advantage of ignoring measured values of poor reliability.

Next, the control unit 21 performs the thresholding process of S37 and the printing process of S38. In the thresholding process, the control unit 21 converts the image data related to the print job to binary image data using the irregular dither matrix 252 selected in S36, and subsequently ends the print job reception process of FIG. 11.

2-4. Effects of the Second Embodiment

The second embodiment described above can obtain the same effects described in the first embodiment. In addition, the printer 2 according to the second embodiment can execute a suitable thresholding process by selecting the irregular dither matrix 252 corresponding to the degree to which the measured values of the density patches P1-P9 deviate from the expected values. In particular, by selecting an irregular dither matrix 252 with a greater switching ratio when the density patches that could not be found properly have a higher density, the printer 2 according to the second embodiment can execute a suitable thresholding process corresponding to the density at which the quality of the printed image worsens. This is particular helpful in suppressing a decline in image quality in low-gradation regions.

While the invention has been described in detail with reference to the embodiments thereof, it would be apparent to those skilled in the art that various changes and modifications may be made therein without departing from the spirit of the invention.

(1) While genuine toner is used as an example of the prescribed colorant in the first embodiment, this prescribed colorant may also include a recommended toner in addition to the genuine toner. An example of recommended toner is toner with known properties that is supplied by a manufacturer other than the manufacturer of the printer. Further, while the prescribed colorant in the first embodiment is a polymer toner, the colorant may be a pulverized toner instead.

(2) The printer 2 according to the second embodiment described above is configured to form a plurality of density patches P1-P9 and to measure their densities, but the printer 2 may be configured to form and measure only one density patch instead. This configuration still allows the printer 2 to select one of the standard dither matrix 251 and irregular dither matrices 252 based on the measured value.

(3) In the second embodiment described above, the printer 2 is configured to select a dither matrix based on measured values of density patches P without determining whether the currently mounted toner cartridge is a genuine product. However, the printer 2 may be configured to determine first whether the toner cartridge is a genuine product, as described in the first embodiment, and to select a dither matrix based on the measured values of density patches P, as described in the second embodiment, only when the toner cartridge is not a genuine product. This configuration can eliminate the processes for forming and measuring the density patches P when the printer 2 is using genuine toner. Moreover, the printer 2 need not change the dither matrix if the measured density values deviate only slightly from the expected values, even when using a third party toner.

(4) While the printer 2 according to the second embodiment described above executes a process for forming the density patches P upon receiving a print job, the printer 2 may be configured to perform this process prior to receiving a print job, such as when the power to the printer 2 is turned on or when the printer 2 detects that a toner cartridge was newly mounted.

(5) The starting dot in the irregular dither matrix 252 may be a size other than 2×2. Provided that the dot size is 2 pixels or greater in both horizontal and vertical directions, the starting dot can be stably formed in toner since all ON pixels constituting the dot neighbor two or more other ON pixels horizontally or vertically.

(6) In the first and second embodiments, threshold values are arranged in the irregular dither matrix 252 so that pixels set to the ON state in the third step (S3) are not separated among a plurality of positions. However, the configuration of the present invention may include cases in which these dots are separated among a plurality of positions.

(7) In the first and second embodiments, threshold values are set in the irregular dither matrix 252 so that both the first and second threshold values are not arranged in cells corresponding to both the new line extending horizontally and the new line extending vertically, but the present invention is not bound by this restriction.

(8) While the printer 2 described in the first and second embodiments forms monochrome images only, the present invention may also be applied to a printer capable of forming color images.

(9) Of the PC 1 and printer 2 constituting the printing system according to the present invention, the printer 2 functions as a control device of the present invention in the first and second embodiments, but the PC 1 may be configured to function as the control device instead. For example, processes executed by the printer 2 in the first and second embodiments may be implemented on the PC 1 as processes of the printer driver 153. In this case, the PC 1 directs the printer 2 to execute the processes for forming and measuring density patches in S32 and S33 described in the second embodiment and acquires the measured values for the density patches from the printer 2.

What is claimed is:

1. A control device comprising:
    a processor; and
    a memory that stores computer program that, when executed by the processor, causes the control device to function as:
        an image acquiring unit configured to acquire image data having an input value; an
        a converting unit configured to convert the image data into binary data by using a first dither matrix, the binary data being used in a printing process, the first dither matrix including a plurality of threshold values assigned to a plurality of cells, each of the plurality of cells being assigned respective one of the plurality of threshold values, the converting unit converting the input value into one of ON-pixel and OFF-pixel for each of the plurality of cells by comparing the input value with the respective one of the plurality of threshold values, the ON-pixel being a pixel set to an ON state, the OFF-pixel being a pixel set to an OFF state,
    wherein the plurality of threshold values in the first dither matrix are arranged such that the ON-pixels grow from a first group of ON-pixels to a second group of ON-pixels as the input value increases, the ON-pixels in the first group corresponding to cells arranged in M rows and N columns, M being a natural number, N being a natural number, the ON-pixels in the second group corresponding to cells arranged in (M+1) rows and (N+1) columns, the second group of the ON-pixels consisting of the first group of ON-pixels and a third group of ON-pixels, the third group of ON-pixels corresponding to (M+N+1) number of cells, at least two of the (M+N+1) number of cells being adjacent to each other and having same threshold values.

2. The control device according to claim 1, wherein the control device is further configured to function as a selecting unit configured to select one of a plurality of dither matrix, the plurality of dither matrix including the first dither matrix and a second dither matrix different from the first dither matrix, the selecting unit selecting the first dither matrix when a colorant to be used in the printing process is a first colorant, the selecting unit selecting the second dither matrix when the coolant to be used in the printing process is a second colorant different from the first colorant,
    wherein the converting unit converts the image data into binary data by using the dither matrix selected by the selecting unit.

3. The control device according to claim 2, wherein the control device is further configured to function as a determining unit configured to determine whether a colorant to be used in the printing process is the second colorant;
    wherein the selecting unit selects the first dither matrix when the determining unit determines that the colorant used in the printing process is different from the second colorant.

4. The control device according to claim 1, wherein the control device is further configured to function as:
    a measured value acquiring unit configured to acquire a measured value from a test image formed by a colorant used in the printing process; and
    a selecting unit configured to select one of a plurality of dither matrices including the first dither matrix, the selecting unit selecting the first dither matrix when a difference between the measured value and a target value to be measured from the test image is greater than a predetermined value,
    wherein the converting unit converts the image data into binary data by using the dither matrix selected by the selecting unit.

5. The control device according to claim 4, wherein the measured value acquiring unit is configured to acquire a plurality of measured values from a plurality of test images respectively, each of the plurality of test images having a target value different from the target values of the others of the plurality of test images, each target value being determined based on a density to be measured of the corresponding test image;
    wherein the first dither matrix has a plurality of preset dither matrices, the plurality of threshold values in each of the plurality of preset dither matrices being arranged such that the ON-pixels grow from the first group of ON-pixels to a fourth group of ON-pixels as the input value increases, the ON-pixels in the fourth group corresponding to cells arranged in (M+k) rows and (N+k) columns, the fourth group of ON-pixels including the second group of ON-pixels, k being a natural number, k being larger as the density of test image whose difference between the target value and the measured value is greater than the predetermined value is higher.

6. The control device according to claim 1, wherein the (M+N+1) number of cells include (M+1) number of cells arranged in a first direction and (N+1) number of cells arranged in a second direction perpendicular to the first direction;

wherein the plurality of threshold values in the first dither matrix are arranged such that at least two of the (M+1) number of cells are adjacent to each other and have same prescribed threshold values, wherein the plurality of threshold values in the first dither matrix are arranged such that at least two of the (M+1) number of cells are adjacent to each other and have same predetermined threshold values, the predetermined threshold value being different from the prescribed threshold value.

7. The control device according to claim 1, wherein the first dither matrix has at least two smallest threshold values among the plurality of threshold values, the at least two smallest values being assigned to at least two of the plurality of cells adjacent to each other.

8. The control device according to claim 1, wherein M is equal to N.

9. The control device according to claim 1, wherein the memory further stores the first dither matrix.

10. A non-transitory computer-readable medium storing a set of program instructions thereon that, when executed by a computer, causes the computer to perform operations comprising:

acquiring image data having an input value; and converting the image data into binary data by using a first dither matrix, the binary data being used in a printing process, the first dither matrix including a plurality of threshold values assigned to a plurality of cells, each of the plurality of cells being assigned respective one of the plurality of threshold values, the input value being converted into one of ON-pixel and OFF-pixel for each of the plurality of cells by comparing the input value with the respective one of the plurality of threshold values, the ON-pixel being a pixel set to an ON state, the OFF-pixel being a pixel set to an OFF state, the plurality of threshold values in the first dither matrix being arranged such that the ON-pixels grow from a first group of ON-pixels to a second group of ON-pixels as the input value increases, the ON-pixels in the first group corresponding to cells arranged in M rows and N columns, M being a natural number, N being a natural number, the ON-pixels in the second group corresponding to cells arranged in (M+1) rows and (N+1) columns, the second group of the ON-pixels consisting of the first group of ON-pixels and a third group of ON-pixels, the third group of ON-pixels corresponding to (M+N+1) number of cells, at least two of the (M+N+1) number of cells being adjacent to each other and having same threshold values.

11. A control method comprising:

acquiring image data having an input value; and converting the image data into binary data by using a first dither matrix, the binary data being used in a printing process, the first dither matrix including a plurality of threshold values assigned to a plurality of cells, each of the plurality of cells being assigned respective one of the plurality of threshold values, the input value being converted into one of ON-pixel and OFF-pixel for each of the plurality of cells by comparing the input value with the respective one of the plurality of threshold values, the ON-pixel being a pixel set to an ON state, the OFF-pixel being a pixel set to an OFF state, the plurality of threshold values in the first dither matrix being arranged such that the ON-pixels grow from a first group of ON-pixels to a second group of ON-pixels as the input value increases, the ON-pixels in the first group corresponding to cells arranged in M rows and N columns, M being a natural number, N being a natural number, the ON-pixels in the second group corresponding to cells arranged in (M+1) rows and (N+1) columns, the second group of the ON-pixels consisting of the first group of ON-pixels and a third group of ON-pixels, the third group of ON-pixels corresponding to (M+N+1) number of cells, at least two of the (M+N+1) number of cells being adjacent to each other and having same threshold values.

* * * * *